United States Patent
Wang

(10) Patent No.: US 9,979,584 B2
(45) Date of Patent: May 22, 2018

(54) TRANSMISSION AND RECEPTION METHODS IMPLEMENTED IN COMMUNICATION DEVICES AND ASSOCIATED COMMUNICATION DEVICES

(71) Applicant: Telefonaktiebolaget LM Ericsson (publ), Stockholm (SE)

(72) Inventor: Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/327,643

(22) PCT Filed: Aug. 25, 2014

(86) PCT No.: PCT/CN2014/085099
§ 371 (c)(1),
(2) Date: Jan. 19, 2017

(87) PCT Pub. No.: WO2016/029343
PCT Pub. Date: Mar. 3, 2016

(65) Prior Publication Data
US 2017/0214564 A1      Jul. 27, 2017

(51) Int. Cl.
*H04L 27/04*      (2006.01)
*H04L 27/34*      (2006.01)
(Continued)

(52) U.S. Cl.
CPC ............ *H04L 27/34* (2013.01); *H04L 1/0606* (2013.01); *H04L 1/0625* (2013.01); *H04L 27/106* (2013.01); *H04L 27/2617* (2013.01)

(58) Field of Classification Search
CPC ..... H04L 27/34; H04L 27/106; H04L 1/0625; H04L 1/0606; H04L 27/2617
See application file for complete search history.

(56) References Cited

U.S. PATENT DOCUMENTS

2008/0212656 A1   9/2008   Feher
2014/0177687 A1   6/2014   Seol et al.
(Continued)

FOREIGN PATENT DOCUMENTS

WO       2015030468 A1       3/2015

OTHER PUBLICATIONS

Hong, Sungnam et al., "FQAM : A Modulation Scheme for Beyond 4G Cellular Wireless Communication Systems," Globecom 2013 Workshop—Emerging Technologies for LTE-Advanced and Beyond-4G, Dec. 9-13, 2013, IEEE, pp. 25-30.

(Continued)

*Primary Examiner* — Dac Ha
(74) *Attorney, Agent, or Firm* — Withrow & Terranova, PLLC

(57) ABSTRACT

The present disclosure provides a transmission method comprising splitting a block of bits to be transmitted into a number of groups each consisting of k+2q bits, wherein k and q are natural numbers and each of the groups includes a subgroup consisting of k bits and two subgroups each consisting of q bits and performing $2^q$-ary QAM modulation on the subgroups of q bits from the groups of k+2q bits to obtain QAM symbols, respectively. The QAM symbols are processed so that two QAM symbols obtained from the two subgroups of q bits in each of the groups of k+2q bits are mapped onto at least two antennas as consecutive processed symbols. Through the use of $2^k$-ary FSK modulation, a frequency tone to which the two consecutive processed symbols are allocated is selected according to the subgroup of k bits from each of the groups of k+2q bits before transmission.

18 Claims, 5 Drawing Sheets

(51) Int. Cl.
  *H04L 27/10*   (2006.01)
  *H04L 1/06*    (2006.01)
  *H04L 27/26*       (2006.01)

(56) References Cited

U.S. PATENT DOCUMENTS

2014/0177756 A1   6/2014  Park et al.
2014/0269992 A1*  9/2014  Hong ................. H04L 27/3405
                                                            375/298
2016/0212006 A1   7/2016  Kim et al.
2017/0134204 A1*  5/2017  Yun .................... H04L 27/2615
2017/0353193 A1* 12/2017  Jang ................... H03M 13/091

OTHER PUBLICATIONS

International Search Report and Written Opinion for International Patent Application No. PCT/CN2014/085099, dated May 29, 2015, 11 pages.

Ho, Paul, et al., "Space-Time FSK: An Implicit Pilot Symbol Assisted Modulation Scheme," IEEE Transactions on Wireless Communications, vol. 6, No. 7, Jul. 2007, 10 pages.

Latif, Asma, "Hybrid QAM-FSK (HQFM) OFDM Tranceiver With Low Papr," Dissertation Submitted to Faculty of Electronic Engineering, Ghulam Ishaq Khan Institute of Engineering Sciences and Technology, Jan. 2009, 177 pages.

Extended European Search Report for European Patent Application No. 14900734.6, dated Apr. 12, 2018, 9 pages.

\* cited by examiner

TRANSMISSION AND RECEPTION METHODS IMPLEMENTED IN COMMUNICATION DEVICES AND ASSOCIATED COMMUNICATION DEVICES

This application is a 35 U.S.C. § 371 national phase filing of International Application No. PCT/CN2014/085099, filed Aug. 25, 2014, the disclosure of which is incorporated herein by reference in its entirety.

TECHNICAL FIELD

The present disclosure generally relates to the technical field of wireless communications, and particularly, to a transmission method implemented in a communication device with multiple antennas, a reception method implemented in a communication device and the associated communication devices.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

With the development of wireless communications, various advanced technologies have been proposed, including such as hybrid Frequency Shift Keying-Quadrature Amplitude Modulation (FSK-QAM).

The hybrid FSK-QAM technology, which combines FSK and QAM, has been studied in some literatures with different names. Theoretical analysis and simulation results show that, for modest code rates in low signal-to-noise ratio regions, the normalized throughputs of the hybrid FSK-QAM scheme are close to those of the traditional QAM or FSK scheme.

Instead of modulating each group of n (n>1) bits on a single frequency tone using the ordinary $2^n$-ary QAM scheme, the hybrid FSK-QAM scheme requires splitting each group of n bits into a subgroup consisting of k bits and a subgroup consisting of q=n−k bits. According to the subgroup of k bits, an active frequency tone is selected among $2^k$ candidates through the use of $2^k$-ary FSK scheme. On the other hand, $2^q$-ary QAM may be performed on the subgroup of q bits to obtain a QAM symbol. Thus, the FSK scheme and the QAM scheme are combined in such a manner that a $2^q$-ary QAM symbol is carried by a selected one of $2^k$ frequency tone candidates.

By way of illustration, FIG. 1 depicts an example of a hybrid FSK-QAM scheme, where a subgroup of k=2 bits from a group of n=4 bits is used for selecting an active frequency tone from $2^k$=4 candidates ($f_0$, $f_1$, $f_2$ and $f_3$), the other subgroup of q=2 bits from the group of 4 bits is used for selecting a QAM symbol from $2^q$=4 QAM constellation points ($q_0$, $q_1$, $q_2$ and $q_3$), and the selected QAM symbol is carried on the selected frequency tone. FIG. 2 further illustrates a result of performing the above-described bit splitting operation, where each group of n bits are split into a subgroup of k bits and a subgroup of q bits.

Another advanced technology is transmit diversity. As a robust and mature Multi-Input Multi-Output (MIMO) transmission technology, the transmit diversity scheme is selectable from various MIMO transmission modes for guaranteeing a reliable reception performance by providing redundant transmissions through multiple antennas deployed at the transmission side. By way of example, for all downlink control channels, including Physical Downlink Control CHannel (PDCCH), Physical Hybrid Automatic repeat request Indicator CHannel (PHICH) and Physical Control Format Indicator CHannel (PCFICH), the transmit diversity scheme may be used to guarantee the reception reliability. For Physical Downlink Shared CHannel (PDSCH), the transmit diversity scheme may also be selected as a fallback mode to guarantee the reliability. This is particularly true for terminal devices which are located at the edge of cells and thus undergo heavy inter-cell interference.

Specific transmit diversity schemes defined by the $3^{rd}$ Generation Partnership Project (3GPP) Long Term Evolution (LTE) are spatial-frequency block code (SFBC) scheme for 2 antenna ports and SFBC-frequency switching transmit diversity (FSTD) for 4 antenna ports, respectively.

By way of illustration, FIG. 3 schematically depicts an exemplary implementation of the SFBC scheme for 2 antenna ports. As illustrated, initially, through the layer mapping block, each pair of consecutive modulation symbols d(2i) and d(2i+1) are mapped onto two layers as $x^{(0)}(i)=d(2i)$ and $x^{(1)}(i)=d(2i+1)$. Then, at the transmit diversity precoding block, Alamouti coding is applied to $x^{(0)}(i)$ and $x^{(1)}(i)$ so that the coded symbols are obtained as follows, $$\begin{bmatrix} x^{(0)}(i) & x^{(1)}(i) \\ -(x^{(1)}(i))^* & (x^{(0)}(i))^* \end{bmatrix},$$

where the symbol * denotes the conjugate operation, the first row of consecutive coded symbols $x^{(0)}(i)$ and $x^{(1)}(i)$ are to be transmitted through antenna port 0, and the second row of consecutive coded symbols $-(x^{(1)}(i))^*$ and $(x^{(0)}(i))^*$ are to be transmitted through antenna port 1.

Next, the coded symbols pass through the Resource Element (RE) mapping block, where the first column of coded symbols $x^{(0)}(i)$ and $-(x^{(1)}(i))^*$ are allocated to an RE (denoted as RE(k)) and the second column of coded symbols $x^{(1)}(i)$ and $(x^{(0)}(i))^*$ are allocated to another RE (denoted as RE(k+1)).

The existing hybrid FSK-QAM scheme cannot be used with the existing transmit diversity scheme, because the application of the former scheme prevents the latter scheme from achieving a satisfactory performance.

SUMMARY

Accordingly, an object of the present disclosure is to provide a solution enabling the combined use of hybrid FSK-QAM and transmit diversity.

According to a first aspect of the present disclosure, there is provided a transmission method implemented in a communication device with multiple antennas. The method comprises splitting a block of bits to be transmitted into a number of groups each consisting of k+2q bits. Each of the groups includes a subgroup consisting of k bits and two subgroups each consisting of q bits, and k and q are natural numbers. The method further comprises performing $2^q$-ary QAM modulation on the subgroups of q bits from the groups of k+2q bits to obtain QAM symbols, respectively. According to a transmit diversity scheme, the QAM symbols are processed so that two QAM symbols obtained from the two subgroups of q bits in each of the groups of k+2q bits are mapped onto each of at least two of the multiple antennas as two consecutive processed symbols. Through the use of $2^k$-ary FSK modulation, a frequency tone to which the two consecutive processed symbols are allocated is selected according to the subgroup of k bits from the respective group of k+2q bits. Lastly, the processed QAM symbols are transmitted through the multiple antennas.

According to a second aspect of the present disclosure, there is provided a communication device comprising multiple antennas, a processor and a transmitter. The processor is configured to split a block of bits to be transmitted into a number of groups each consisting of k+2q bits. Each of the groups includes a subgroup consisting of k bits and two subgroups each consisting of q bits, and k and q are natural numbers. The processor is further configured to perform $2^q$-ary QAM modulation on the subgroups of q bits from the groups of k+2q bits to obtain QAM symbols, respectively. According to a transmit diversity scheme, the processor processes the QAM symbols so that two QAM symbols obtained from the two subgroups of q bits in each of the groups of k+2q bits are mapped onto each of at least two of the multiple antennas as two consecutive processed symbols. Through the use of $2^k$-ary FSK modulation, the processor selects a frequency tone to which the two consecutive processed symbols are allocated, according to the subgroup of k bits from the respective group of k+2q bits. The transmitter is configured to transmit the processed QAM symbols through the multiple antennas.

By splitting the bits to be transmitted into groups each including a subgroup consisting of k bits and two subgroups each consisting of q bits, mapping two QAM symbols obtained from the two subgroups of q bits onto each of at least two of the multiple antennas as two consecutive processed QAM symbols and selecting a frequency tone for the two consecutive processed QAM symbols according to the subgroup of k bits, it can be ensured that the consecutive processed QAM symbols are allocated to the same frequency tone. As such, the combined use of hybrid FSK-QAM and transmit diversity is made possible.

According to a third aspect of the present disclosure, there is provided a reception method implemented in a communication device. The method comprises processing a received signal, which carries hybrid FSK-QAM symbols in accordance with a transmit diversity scheme, to obtain a first number of bit groups each consisting of k soft bits and a second number of bit groups each consisting of q soft bits. Each group of k soft bits represents a frequency tone, each group of q soft bits represents a QAM symbol, and the first number is equal to the second number. The method further comprises generating a third number of bit groups from the first number of bit groups by combining each pair of consecutive bit groups from the first number of bit groups. The third number is equal to half the second number. Then, a sequence of soft bits is constructed from the third number of bit groups and the second number of bit groups.

According to a fourth aspect of the present disclosure, there is provided communication device comprising at least one antenna, a receiver and a processor. The receiver is configured to receive through the at least one antenna a wireless signal, which carries hybrid FSK-QAM symbols in accordance with a transmit diversity scheme. The processor is configured to process the received wireless signal to obtain a first number of bit groups each consisting of k soft bits and a second number of bit groups each consisting of q soft bits. Each group of k soft bits represents a frequency tone, each group of q soft bits represents a QAM symbol, and the first number is the same as the second number. The processor is further configured to generate a third number of bit groups from the first number of bit groups by combining each pair of consecutive bit groups from the first number of bit groups. The third number is equal to half the second number. From the third number of bit groups and the second number of bit groups, the processor constructs a sequence of soft bits.

The reception method and communication device according to the third and fourth aspects of the present disclosure can be used to receive the diversity transmission of hybrid FSK-QAM symbols according to the first and second aspects of the present disclosure. By processing the received signal to obtain a first number of bits groups each consisting of k soft bits representing a frequency tone and combining each pair of consecutive bit groups from the first number of bit groups to generate a third number of bit groups, it is possible to make good use of the redundancy due to each pair of consecutive bit groups from the first number of bit groups representing the same frequency tone. Accordingly, the reception performance may be improved.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
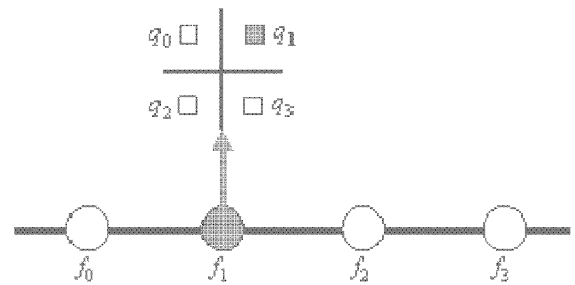
FIG. 1 is a schematic diagram illustrating an exemplary implementation of a hybrid FSK-QAM scheme according to the prior art.
Figure 2:
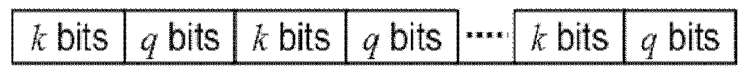
FIG. 2 is a schematic diagram illustrating an exemplary result of performing a bit splitting operation according to the prior art hybrid FSK-QAM scheme.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure, terms like "access node" and "terminal device" as used herein should be understood in a broad sense. Specifically, the access node should be understood to refer more broadly to any kind of wireless communication station capable of directly communicating with one or more wireless terminals. For example, the access node may be any suitable wireless communication intermediary devices, such as a wireless relay node, a wireless router, a wireless access point, a base station or a base site. The terminal device should be understood to encompass a mobile telephone, a smartphone, a wireless-enabled tablet or personal computer, a wireless machine-to-machine unit, and the like.

To achieve a satisfactory transmit diversity performance, the channels on which each row of consecutive coded symbols are transmitted need to be almost the same. This in turn requires that the consecutive coded symbols be allocated to the same frequency tone. For SFBC, this condition can be well satisfied by allocating each row of consecutive coded symbols to consecutive Orthogonal Frequency Division Multiplexing (OFDM) subcarriers belonging to the same frequency tone. In a non-OFDM system, Spatial-Time Block Code (STBC) may be used instead of SFBC and the consecutive coded symbols shall be allocated to the same frequency carrier.

Figure 3:
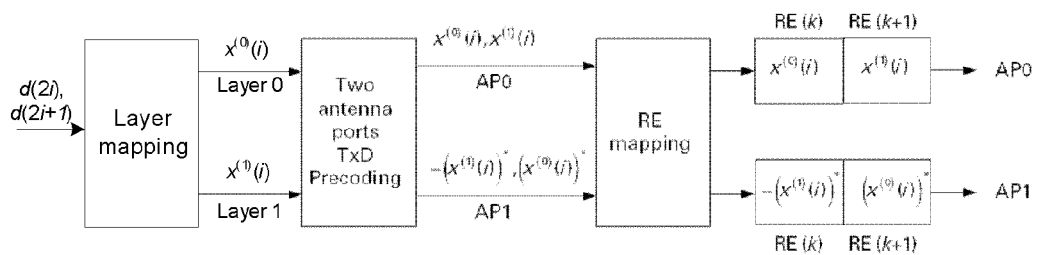
FIG. 3 is a schematic diagram illustrating an exemplary implementation of a transmit diversity scheme according to the prior art.

However, as mentioned in the background section, the existing hybrid FSK-QAM scheme cannot be used with the existing transmit diversity scheme, because the application of the former scheme prevents the latter scheme from achieving a satisfactory performance. Specifically, referring back to FIG. 3, since the existing hybrid FSK-QAM scheme may result in consecutive QAM symbols d(2i) and d(2i+1) to be carried by different frequency tones, it is not possible for the transmit diversity scheme to allocate consecutive coded symbols $x^{(0)}(i)$ and $x^{(1)}(i)$ or $-(x^{(1)}(i))^*$ and $(x^{(0)}(i))^*$ to the same frequency tone.

To take the advantages of both hybrid FSK-QAM and transmit diversity, transmission methods and associated communication devices enabling the combined use of hybrid FSK-QAM and transmit diversity are proposed here.

Figure 4:
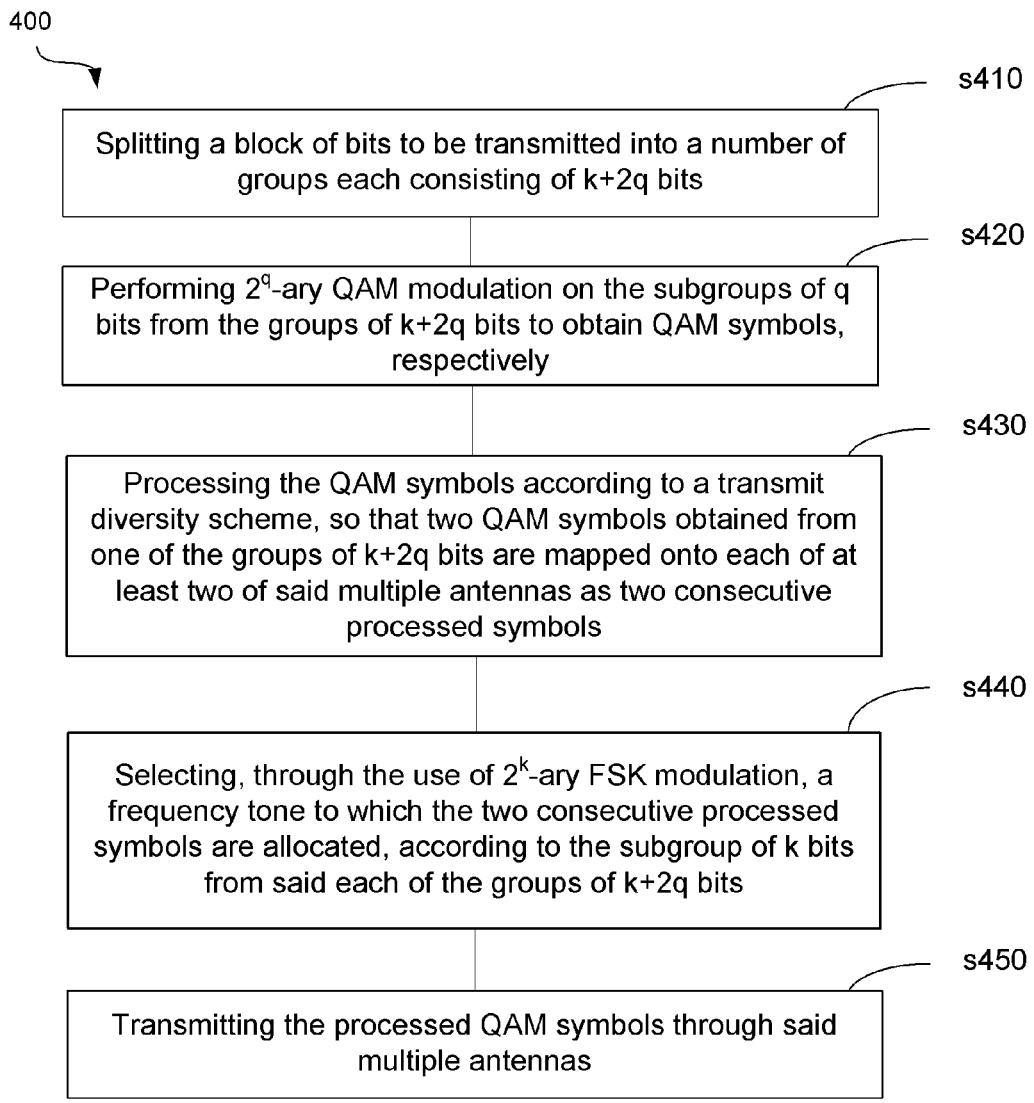
FIG. 4 is a flow chart illustrating a transmission method implemented in a communication device according to the present disclosure.

FIG. 4 schematically illustrates a transmission method 400 implemented in a communication device with multiple antennas according to the present disclosure.

As illustrated, initially, a block of bits to be transmitted are split into a number of groups each consisting of k+2q bits at step s410. Each of the groups includes a subgroup consisting of k bits and two subgroups each consisting of q bits. Here, k and q are natural numbers.

In case the number of bits contained in the block of bits is not a multiple of k+2q, padding bits may be appended to the block of bits as appropriate.

Figure 5:
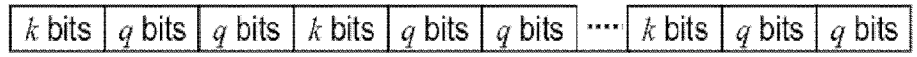
FIG. 5 is a schematic diagram illustrating an exemplary result of performing a bit splitting step of the transmission method illustrated in FIG. 4.

For illustration, FIG. 5 depicts a result of performing above-described bit splitting operation. Note that, although a subgroup of k bits is illustrated in FIG. 5 to be followed by two subgroups of q bits, the subgroup of k bits and the two subgroups of q bits may be arranged in any other order in practical implementation.

After step s410, $2^q$-ary QAM modulation is performed at step s420 on the subgroups of q bits from the groups of k+2q bits to obtain QAM symbols, respectively.

Then, at step s430, the obtained QAM symbols are processed according to a transmit diversity scheme, so that two QAM symbols obtained from the two subgroups of q bits in each of the groups of k+2q bits are mapped onto each of at least two of the multiple antennas as two consecutive processed symbols.

In parallel or in series with the execution of steps s420 and s430, $2^k$-ary FSK modulation is performed at step s440 to select a frequency tone for the two consecutive processed symbols, according to the subgroup of k bits from said each of the groups of k+2q bits.

In this manner, it can be ensured that the consecutive processed symbols are allocated to the same frequency tone. Accordingly, the combined use of hybrid FSK-QAM and transmit diversity is made possible.

Finally, at step s450, the processed QAM symbols are transmitted through said multiple antennas.

As mentioned in the background section, if the communication device is provided with two antennas, the obtained QAM symbols may be processed according to the SFBC or STBC scheme at step s430. In this case, the same denotations as used in the background section may apply. Specifically, said two QAM symbols referred to at step s430 may be denoted as d(2i) and d(2i+1), and they are mapped onto one of the two antennas as consecutive processed symbols $x^{(0)}(i)$ and $x^{(1)}(i)$ and mapped onto the other antenna as $-(x^{(1)}(i))^*$ and $(x)^{(0)}(i))^*$.

Note that SFBC and STBC are just given as exemplary implementations to achieve transmit diversity and many alternative implementations may be used instead. For example, if the communication device is provided with four antennas, the transmit diversity scheme may be STBC-Time Switching Transmit Diversity (TSTD) or SFBC-Frequency Switching Transmit Diversity (FSTD). In that case, pairs of the obtained QAM symbols d(2i) and d(2i+1) may be alternately mapped onto each of two of the four antennas and each of the other two antennas.

Figure 6:
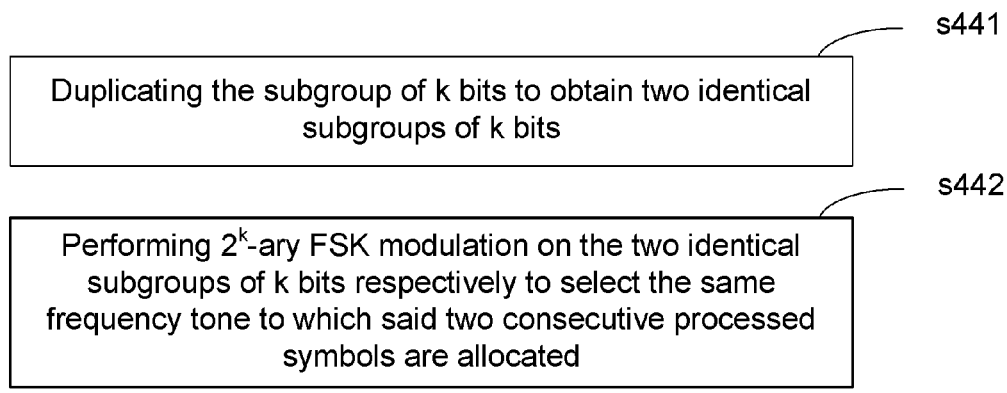
FIG. 6 is a schematic diagram illustrating operations of a step in the method illustrated FIG. 4.

In an embodiment, the step s440 may comprise substeps s441 and s442 as illustrated in FIG. 6. At step s441, the subgroup of k bits may be duplicated to obtain two identical subgroups of k bits. At step s442, the $2^k$-ary FSK modulation may be performed on the two identical subgroups of k bits respectively, to select the same frequency tone to which said two consecutive processed symbols are allocated.

In an embodiment, the method 400 may be implemented in an OFDM system in order to benefit from the combined use of hybrid FSK-QAM and OFDM.

Specifically, such a combination may not only reduce the peak-to-average power ratio (PAPR) but also improve the transmission rate for a cell-edge user, as compared with the traditional combination of QAM and OFDM. That is why hybrid FSK-QAM has been proposed as the advanced modulation technology candidate for 5G cellular wireless communication systems (see Reference [1]).

Figure 7:
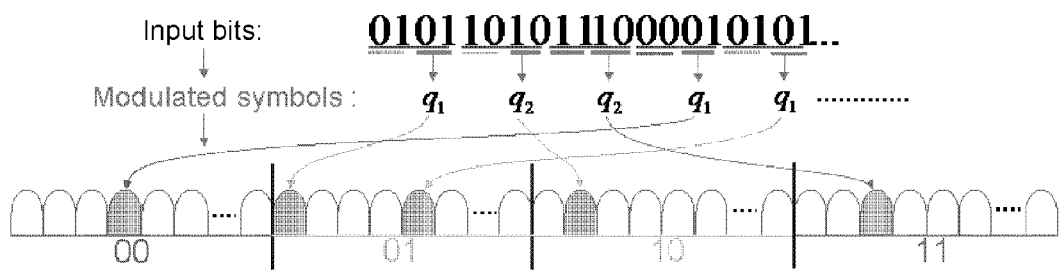
FIG. 7 is a schematic diagram illustrating how to implement hybrid FSK-QAM in an OFDM system according to the prior art.

FIG. 7 schematically depicts how to implement hybrid FSK-QAM in an OFDM system according to the prior art. As illustrated, bits to be transmitted are split into groups of n=4 bits, and each of the groups includes a subgroup of k=2 bits and a subgroup of q=2 bits. The subgroup of k=2 bits are used to select one of $2^2$=4 candidate frequency tones, each of which corresponds to a group of consecutive OFDM subcarriers. The subgroup of q=2 bits are used to select a 4-ary QAM symbol to be carried on the selected frequency tone. The QAM symbol obtained from the subgroup of q=2 bits in the m-th bit group are allocated to the m-th subcarrier, which belongs to the frequency tone selected based on the subgroup of k=2 bits in the m-th group of bits.

In addition to the above-mentioned benefits from the combined used of hybrid FSK-QAM and OFDM such as a lower PAPR and a higher transmission rate, implementing the diversity-enabled transmission method 400 in an OFDM system may of course bring about diversity gain.

Due to the execution of step s410, such an implementation splits the bits to be transmitted into groups each of which includes a subgroup consisting of k bits and two subgroups each consisting of q bits, instead of splitting the bits as shown in FIG. 7. Adaptively, such an implementation may further require that said two consecutive processed symbols referred to at step s430 be allocated to two consecutive subcarriers among the group of OFDM subcarriers corresponding to the frequency tone selected at step s440.

In an embodiment, the transmission method 400 may be implemented in an access node or a terminal device.

Figure 8:
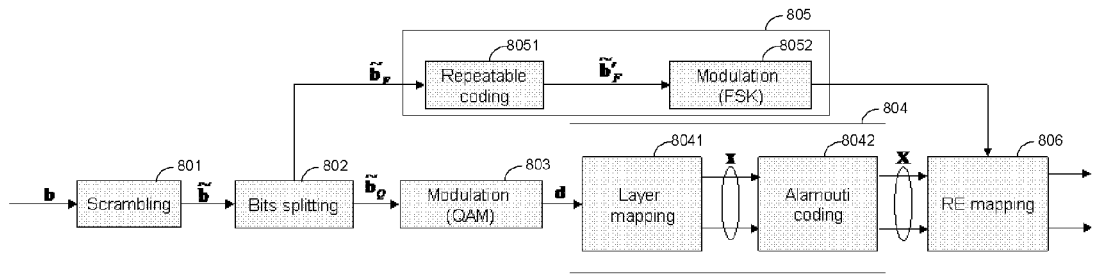
FIG. 8 is a schematic diagram illustrating an exemplary data processing procedure at the transmission side which encompasses main operations of the transmission method illustrated in FIG. 4 as well as other optional operations.

To facilitate a better understanding of the proposed method 400, FIG. 8 presents an exemplary data processing procedure at the transmission side which encompasses main operations of the transmission method 400 as well as other optional operations. Specifically, operations performed at blocks 802, 803, 804 and 805 in FIG. 8 correspond to the steps s410, s420, s430 and s440 in FIG. 4, respectively.

As illustrated in FIG. 8, initially, a block of bits b={b(0), . . . , b($M_{bit}$−1)} may be scrambled at block 801. Here, it is assumed that the block of bits b={b(0), . . . , b($M_{bit}$−1)} are channel-coded bits in a codeword and $M_{bit}$ denotes the number of bits in the codeword.

Then, the scrambled block of bits $\tilde{b}$={$\tilde{b}$(0), . . . , $\tilde{b}$($M_{bit}$−1)} may be split at block 802 into a number of bit groups, each of which includes a subgroup consisting of k bits and two subgroups each consisting of q bits.

Denoting the m-th subgroup of k bits and the m-th subgroup of q bits as $\tilde{b}_f$(m) and $\tilde{b}_q$(m) respectively, the collection of the subgroups of k bits and the collection of the subgroups of q bits may be denoted as vectors $\tilde{b}_F$={$\tilde{b}_f$(0), . . . , $\tilde{b}_f$($M_{F,bit}$−1)} and $\tilde{b}_Q$={$\tilde{b}_q$(0), . . . , $\tilde{b}_q$($M_{Q,bit}$−1)} respectively, where $M_{F,bit}$=$M_{bit}$/(2q+k) denotes the number of subgroups of k bits and $M_{Q,bit}$=2$M_{bit}$/(2q+k) denotes the number of subgroups of q bits.

In the lower branch of FIG. 8, the subgroups of q bits $\tilde{b}_q$(0), . . . , $\tilde{b}_q$($M_{Q,bit}$−1) may be modulated at block 803 to obtain QAM symbols, respectively. Here, the obtained QAM symbols may be collectively denoted as a vector d={d(0), . . . , d($M_{symb}$−1)}, and $M_{symb}$=$M_{Q,bit}$=2$M_{bit}$/(2q+k) denotes the number of the QAM symbols in the vector.

Subsequently, the QAM symbols d(0), . . . , d($M_{symb}$−1) may go through block 804, where they are processed according to a transmit diversity scheme and as a result each pair of the QAM symbols d(2i) and d(2i+1) are mapped onto each of at least two of the multiple antennas at the transmission side as two consecutive processed symbols.

For the two consecutive processed symbols, the same frequency tone is selected at block 805 in the upper branch of FIG. 8 by performing $2^k$-ary FSK modulation on the i-th subgroup of k bits $\tilde{b}_f$(i). At block 806, the two consecutive processed symbols are allocated to the selected frequency tone.

Optionally, the block 804 may comprise two subblocks 8041 and 8042, at which layer mapping and Alamouti coding may be performed respectively. In case the number of the multiple antennas is 2, the output from the block 805 may be written as follows $$X^{(0)}=\{d(0),d(1), \ldots ,d(M_{symb}-2),d(M_{symb}-1)\}$$

$$X^{(1)}=\{d^*(1),-d^*(0) \ldots ,d^*(M_{symb}-1),-d^*(M_{symb}-2)\}.$$

Additionally, the block 805 may comprise two subblocks 8051 and 8052, where each of the subgroups of k bits $\tilde{b}_f$(0), . . . , $\tilde{b}_f$($M_{F,bit}$−1) may be duplicated to obtain two identical subgroups of k bits $\tilde{b}_f$(0), $\tilde{b}_f$(0) . . . , $\tilde{b}_f$($M_{F,bit}$−1), $\tilde{b}_f$($M_{F,bit}$−1) and $2^k$-ary FSK modulation may be performed on the two identical subgroups of k bits respectively to select the same frequency tone.

Note that the procedure of FIG. 8 is given for illustration rather than for limitation. Certain operations in the exemplary procedure may be replaced with variants described hereinabove or even omitted as appropriate.

Figure 9:
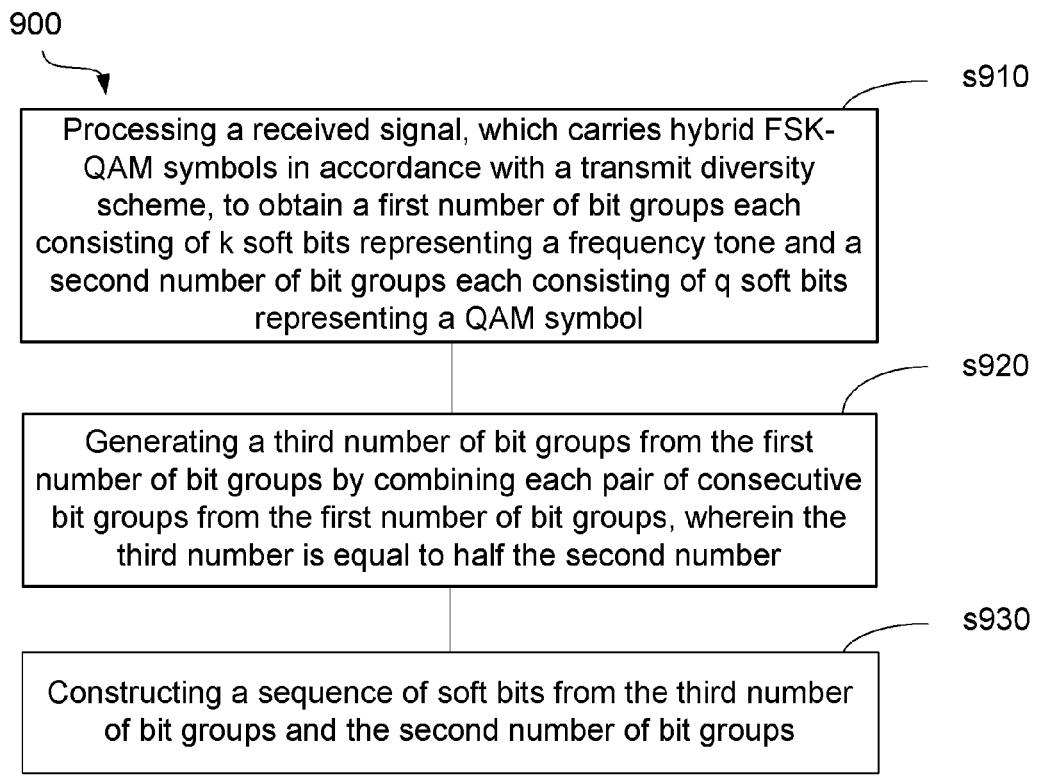
FIG. 9 is a flow chart illustrating a reception method according to the present disclosure, which may be used to receive diversity transmission of hybrid FSK-QAM symbols according to the transmission method illustrated in FIG. 4.

FIG. 9 schematically illustrates a reception method 900 according to the present disclosure, which can be used to receive diversity transmission of hybrid FSK-QAM symbols according to the transmission method 400. Also, the reception method 900 is implemented in a communication device, which may be an access node or a terminal device.

As illustrated, initially, a received signal, which carries hybrid FSK-QAM symbols in accordance with a transmit diversity scheme, is processed at step s910 to obtain a first number of bit groups each consisting of k soft bits and a second number of bit groups each consisting of q soft bits. Each group of k soft bits represents a frequency tone. Each group of q soft bits represents a QAM symbol. The first number is equal to the second number.

At this step, existing algorithms such as maximum likelihood detection and coherent detection may be used to demodulate the hybrid FSK-QAM symbols to obtain the first number of bits groups and the second number of bit groups. Descriptions of these well-known algorithms are omitted so as to not obscure the description with unnecessary detail.

For illustration, the first number of bit groups and the second number of bits groups may be collectively denoted as $$y'_F = \{y'_f(0), y'_f(1) \ldots y'_f(M_{Q,bit}-2), y'_f(M_{Q,bit}-1)\} \text{ and}$$

$$y_Q = \{y_q(0), y_q(1) \ldots y_q(M_{Q,bit}-2), y_q(M_{Q,bit}-1)\},$$

respectively.

Then, at step s920, a third number of bit groups $y_F = \{y_f(0), \ldots, y_f(M_{F,bit}-1)\}$ is constructed from the first number of bit groups $y'_F = \{y'_f(0), y'_f(1) \ldots, y'_f(M_{Q,bit}-2), y'_f(M_{Q,bit}-1)\}$, by combining each pair of consecutive bit groups from the first number of bit groups $\{y_f(0), \ldots, y_f(M_{F,bit}-1)\} = \{y'_f(0)+y'_f(1), \ldots, y'_f(M_{Q,bit}-2)+y'_f(M_{Q,bit}-1)\}$, wherein the third number is equal to half the second number. That is, $M_{F,bit} = M_{Q,bit}/2$.

At this step, various existing algorithms such as Maximal Ratio Combining (MRC), Equal Gain Combining (EGC) and Selective Combining (SC) may be used to do the combination. As such, it is possible to make good use of the redundancy due to each pair of consecutive bit groups from the first number of bit groups $y'_F = \{y'_f(0), y'_f(1) \ldots, y'_f(M_{Q,bit}-2), (M_{Q,bit}-1)\}$ representing the same frequency tone. Accordingly, the reception performance may be improved.

Next, at step s930, a sequence of soft bits is constructed from the third number of bit groups $y_F = \{y_f(0), \ldots, y_f(M_{F,bit}-1)\}$ and the second number of bit groups $y_Q = \{y_q(0), y_q(1) \ldots, y_q(M_{Q,bit}-2), y_q(M_{Q,bit}-1)\}$. In case the bit splitting operation at the transmission side gives a result illustrated in FIG. 5, the sequence of soft bits may be constructed from the third number of bit groups and the second number of bit groups as follows $y = \{y_f(0), y_q(0), y_q(1) \ldots, y_f(i), y_q(2i), y_q(2i-1) \ldots, y_f(M_{F,bit}-1), y_q(M_{Q,bit}-2), y_q(M_{Q,bit}-1)\}$. That is, each bit group from the third number of bit groups is followed by a respective pair of consecutive bit groups from the second number of bit groups.

In the following, structures of a communication device 1000 where the above-described transmission method 400 may be implemented and a communication device 1100 where the above-described reception method 900 may be implemented will be described with reference to FIGS. 10 and 11, respectively.

Figure 10:
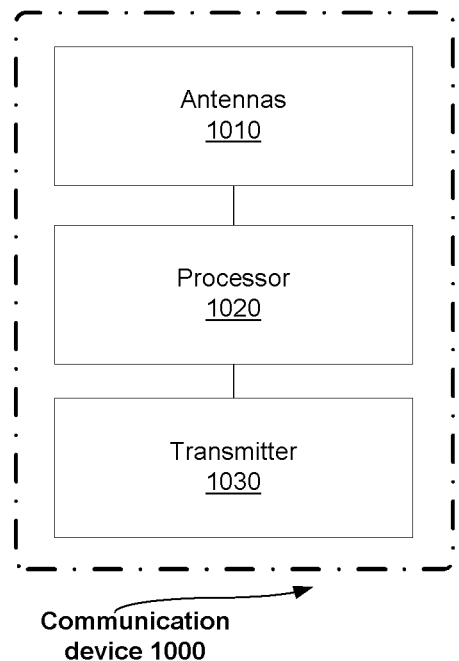
FIG. 10 is a schematic diagram illustrating a structure of a communication device according to the present disclosure, where the transmission method illustrated in FIG. 4 may be implemented.

As illustrated in FIG. 10, the communication device 1000 comprises multiple antennas 1010, a processor 1020 and a transmitter 1030. The processor 1020 is configured to split a block of bits to be transmitted into a number of groups each consisting of k+2q bits, wherein k and q are natural numbers. Each of the groups includes a subgroup consisting of k bits and two subgroups each consisting of q bits. The processor 1020 is further configured to perform $2^q$-ary QAM modulation on the subgroups of q bits from the groups of k+2q bits to obtain QAM symbols, respectively. According to a transmit diversity scheme, the processor 1020 processes the QAM symbols so that two QAM symbols obtained from the two subgroups of q bits in each of the groups of k+2q bits are mapped onto each of at least two of said multiple antennas as two consecutive processed symbols. Through the use of $2^k$-ary FSK modulation, the processor 1020 selects a frequency tone to which the two consecutive processed symbols are allocated, according to the subgroup of k bits from said each of the groups of k+2q bits. The transmitter 1030 is configured to transmit the processed QAM symbols through said multiple antennas 1010.

In an embodiment, the processor 1020 may be configured to duplicate the subgroup of k bits to obtain two identical subgroups of k bits. The processor 1020 may be further configured to perform the $2^k$-ary FSK modulation on the two identical subgroups of k bits respectively to select the same frequency tone to which said two consecutive processed symbols are allocated, so as to select the frequency tone to which the two consecutive processed symbols are allocated.

In an embodiment, the communication device 1000 may be used in an OFDM system, where a group of consecutive OFDM subcarriers corresponds to one frequency tone. Said two consecutive processed symbols may be allocated to two consecutive subcarriers among the group of OFDM subcarriers corresponding to the selected frequency tone.

In an embodiment, the number of the antennas may be 2 and the transmit diversity scheme may be an STBC scheme or an SFBC scheme.

In an embodiment, the number of the antennas may be 4 and the transmit diversity scheme may be an STBC-TSTD scheme or an SFBC-FSTD scheme.

Figure 11:
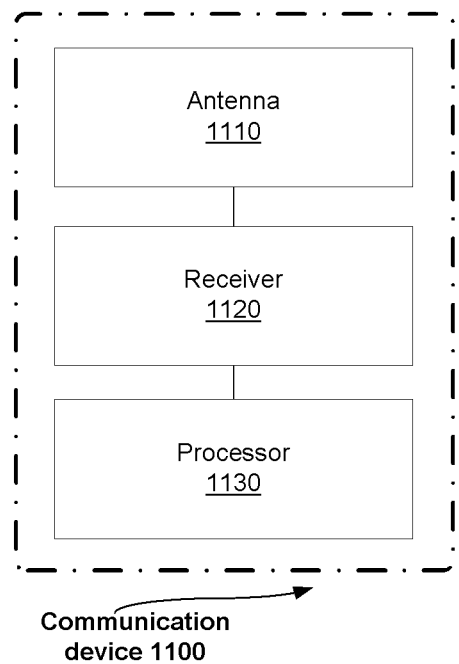
FIG. 11 is a schematic diagram illustrating a structure of a communication device according to the present disclosure, where the reception method illustrated in FIG. 9 may be implemented.

As illustrated in FIG. 11, the communication device 1100 comprises at least one antenna 1110, a receiver 1120 and a processor 1130. The receiver 1120 is configured to receive through the at least one antenna 1110 a wireless signal, which carries hybrid FSK-QAM symbols in accordance with a transmit diversity scheme. The processor 1130 is configured to process the received wireless signal to obtain a first number of bit groups each consisting of k soft bits and a second number of bit groups each consisting of q soft bits. Each group of k soft bits represents a frequency tone, each group of q soft bits represents a QAM symbol, and the first number is the same as the second number. The processor 1130 is further configured to generate a third number of bit groups from the first number of bit groups by combining each pair of consecutive bit groups from the first number of bit groups. The third number is equal to half the second number. From the third number of bit groups and the second number of bit groups, the processor 1130 constructs a sequence of soft bits.

In an embodiment, the processor 1130 may be configured to construct the sequence of soft bits from the third number of bit groups and the second number of bit groups in such a manner that each bit group from the third number of bit groups is followed by a respective pair of consecutive bit groups from the second number of bit groups.

In some embodiments, the communication device 1000 may be an access node or a terminal device. Correspondingly, the communication device 1100 may be a terminal device or an access node.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

REFERENCE

[1] Sungnam Hong, et al. "FQAM_A Modulation Scheme for Beyond 4G Cellular Wireless Communication Systems", Globecom 2013 workshop.

What is claimed is:

1. A transmission method implemented in a communication device with multiple antennas, comprising:

splitting a block of bits to be transmitted into a number of groups each consisting of k+2q bits, wherein k and q are natural numbers and each of the groups includes a subgroup consisting of k bits and two subgroups each consisting of q bits;

performing $2^q$-ary Quadrature Amplitude Modulation (QAM) modulation on the subgroups of q bits from the groups of k+2q bits to obtain QAM symbols, respectively;

processing the QAM symbols according to a transmit diversity scheme, so that two QAM symbols obtained from the two subgroups of q bits in each of the groups of k+2q bits are mapped onto each of at least two of said multiple antennas as two consecutive processed symbols;

selecting, through the use of $2^k$-ary Frequency Shift Keying (FSK) modulation, a frequency tone to which the two consecutive processed symbols are allocated, according to the subgroup of k bits from said each of the groups of k+2q bits; and transmitting the processed QAM symbols through said multiple antennas.

2. The method of claim 1, wherein said selecting the frequency tone to which the two consecutive processed symbols are allocated comprises:

duplicating the subgroup of k bits to obtain two identical subgroups of k bits;

performing the $2^k$-ary FSK modulation on the two identical subgroups of k bits respectively to select the same frequency tone to which said two consecutive processed symbols are allocated.

3. The method of claim 1, wherein the method is implemented in an Orthogonal Frequency Division Multiplexing (OFDM) system where a group of consecutive OFDM subcarriers corresponds to one frequency tone, and said two consecutive processed symbols are allocated to two consecutive subcarriers among the group of OFDM subcarriers corresponding to the selected frequency tone.

4. The method of claim 1, wherein the number of said multiple antennas is 2 and the transmit diversity scheme is a Spatial-Time Block Code (STBC) scheme or a Spatial-Frequency Block Code (SFBC) scheme.

5. The method of claim 1, wherein the number of said multiple antennas is 4 and the transmit diversity scheme is an STBC-Time Switching Transmit Diversity (TSTD) scheme or an SFBC-Frequency Switching Transmit Diversity (FSTD) scheme.

6. The method of claim 1, wherein the communication device is an access node or a terminal device.

7. A reception method implemented in a communication device, the method comprising:

processing a received signal, which carries hybrid Frequency Shift Keying-Quadrature Amplitude Modulation (FSK-QAM) symbols in accordance with a transmit diversity scheme, to obtain a first number of bit groups each consisting of k soft bits representing a frequency tone and a second number of bit groups each consisting of q soft bits representing a QAM symbol, wherein the first number is equal to the second number, wherein k and q are natural numbers;

generating a third number of bit groups from the first number of bit groups by combining each pair of consecutive bit groups from the first number of bit groups, wherein the third number is equal to half the second number; and constructing a sequence of soft bits from the third number of bit groups and the second number of bit groups.

8. The method of claim 7, wherein the sequence of soft bits is constructed from the third number of bit groups and the second number of bit groups in such a manner that each bit group from the third number of bit groups is followed by a respective pair of consecutive bit groups from the second number of bit groups.

9. The method of claim 7, wherein the communication device is an access node or a terminal device.

10. A communication device, comprising:

multiple antennas;

a processor configured to split a block of bits to be transmitted into a number of groups each consisting of k+2q bits, wherein k and q are natural numbers and each of the groups includes a subgroup consisting of k bits and two subgroups each consisting of q bits, perform $2^q$-ary QAM modulation on the subgroups of q bits from the groups of k+2q bits to obtain QAM symbols, respectively, process the QAM symbols according to a transmit diversity scheme, so that two QAM symbols obtained from the two subgroups of q bits in each of the groups of k+2q bits are mapped onto each of at least two of said multiple antennas as two consecutive processed symbols, and select, through the use of $2^k$-ary FSK modulation, a frequency tone to which the two consecutive processed symbols are allocated, according to the subgroup of k bits from said each of the groups of k+2q bits; and a transmitter configured to transmit the processed QAM symbols through said multiple antennas.

11. The communication device of claim 10, wherein the processor is configured to:

duplicate the subgroup of k bits to obtain two identical subgroups of k bits, and perform the $2^k$-ary FSK modulation on the two identical subgroups of k bits respectively to select the same frequency tone to which said two consecutive processed symbols are allocated, so as to select the frequency tone to which the two consecutive processed symbols are allocated.

12. The communication device of claim 10, wherein the communication device is used in an Orthogonal Frequency Division Multiplexing (OFDM) system where a group of consecutive OFDM subcarriers corresponds to one frequency tone, and said two consecutive processed symbols are allocated to two consecutive subcarriers among the group of OFDM subcarriers corresponding to the selected frequency tone.

13. The communication device of claim 10, wherein the number of said multiple antennas is 2 and the transmit diversity scheme is a Spatial-Time Block Code (STBC) scheme or a Spatial-Frequency Block Code (STBC) scheme.

14. The communication device of claim 10, wherein the number of said multiple antennas is 4 and the transmit diversity scheme is an STBC-Time Switching Transmit Diversity (TSTD) scheme or an SFBC-Frequency Switching Transmit Diversity (FSTD) scheme.

15. The communication device of claim 10, wherein the communication device is an access node or a terminal device.

16. A communication device, comprising:
at least one antenna;
a receiver configured to receive through the at least one antenna a wireless signal, which carries hybrid FSK-QAM symbols in accordance with a transmit diversity scheme; and
a processor configured to
process the received wireless signal to obtain a first number of bit groups each consisting of k soft bits representing a frequency tone and a second number of bit groups each consisting of q soft bits representing a QAM symbol, wherein the first number is the same as the second number, wherein k and q are natural numbers,
generate a third number of bit groups from the first number of bit groups by combining each pair of consecutive bit groups from the first number of bit groups, wherein the third number is equal to half the second number, and
construct a sequence of soft bits from the third number of bit groups and the second number of bit groups.

17. The communication device of claim 16, wherein the processor is configured to construct the sequence of soft bits from the third number of bit groups and the second number of bit groups in such a manner that each bit group from the third number of bit groups is followed by a respective pair of consecutive bit groups from the second number of bit groups.

18. The communication device of claim 16, wherein the communication device is an access node or a terminal device.

* * * * *